(12) United States Patent
Morimoto et al.

(10) Patent No.: US 8,667,517 B2
(45) Date of Patent: Mar. 4, 2014

(54) OBJECTIVE LENS HOLDER, OBJECTIVE LENS DRIVING DEVICE USING THE SAME, OPTICAL PICKUP DEVICE, AND METHOD FOR MANUFACTURING OBJECTIVE LENS DRIVING DEVICE

(75) Inventors: Shunichi Morimoto, Ota (JP); Noboru Tajiri, Gunma (JP); Shingo Matsuzaki, Gunma (JP); Mitsuhiko Uchida, Gunma (JP)

(73) Assignee: SANYO Electric Co., Ltd., Moriguchi (JP)

( * ) Notice: Subject to any disclaimer, the term of this patent is extended or adjusted under 35 U.S.C. 154(b) by 0 days.

(21) Appl. No.: 13/547,801

(22) Filed: Jul. 12, 2012

(65) Prior Publication Data
US 2013/0019255 A1     Jan. 17, 2013

(30) Foreign Application Priority Data

Jul. 13, 2011 (JP) .................................. 2011-154760

(51) Int. Cl.
*G11B 7/00* (2006.01)
(52) U.S. Cl.
USPC ....................................................... 720/683

(58) Field of Classification Search
USPC ............. 369/44.14–44.16; 720/672, 681–687
See application file for complete search history.

(56) References Cited

U.S. PATENT DOCUMENTS

| 5,841,609 | A * | 11/1998 | Tochiyama | ................ | 360/244.7 |
| 2007/0183294 | A1* | 8/2007 | Takahashi | ................ | 369/112.02 |
| 2008/0095020 | A1* | 4/2008 | Takahashi et al. | ....... | 369/112.24 |
| 2010/0246370 | A1* | 9/2010 | Iijima et al. | ............. | 369/112.23 |

FOREIGN PATENT DOCUMENTS

JP    2008-226292    9/2008

* cited by examiner

*Primary Examiner* — Nathan Danielsen
(74) *Attorney, Agent, or Firm* — Morrison & Foerster LLP

(57) ABSTRACT

Provided is a compact-type objective lens (OBL) holder and the like provided with a bobbin making it possible to appropriately wind a coil therearound. An OBL holder of the present invention includes: a main surface portion provided with a fixing part on which an objective lens is fixed; and a first side-wall portion and a second side-wall portion provided with bobbins around which tracking coils for driving the OBL holder itself by using a magnetic effect are wound. Further, in the present invention, each bobbin includes a tubular portion and a through-hole penetrating the tubular portion in a thickness direction thereof. Thus, an adhesive can be supplied to the tracking coil through the through-hole.

7 Claims, 6 Drawing Sheets

US 8,667,517 B2

OBJECTIVE LENS HOLDER, OBJECTIVE LENS DRIVING DEVICE USING THE SAME, OPTICAL PICKUP DEVICE, AND METHOD FOR MANUFACTURING OBJECTIVE LENS DRIVING DEVICE

This application claims priority from Japanese Patent Application Number JP 2011-154760 filed on Jul. 13, 2011, the content of which is incorporated herein by reference in its entirety.

BACKGROUND OF THE INVENTION

1. Field of the Invention

The present invention relates to an objective lens holder to which an objective lens is attached, an objective lens driving device in which the objective lens holder is supported movably relative to an actuator frame, an optical pickup device, and a method for manufacturing the objective lens driving device. The present invention particularly relates to an objective lens holder and the like in which a coil is wound around a bobbin provided on a side wall of the objective lens holder.

2. Description of the Related Art

In an objective lens driving device in an optical head configured to optically read and write a signal from and to an optical disc, an objective lens holder (hereinafter referred to as an OBL holder) with an objective lens attached thereto is supported movably relative to an actuator frame. In addition, focusing coils and tracking coils, and tilt coils as necessary are attached to the OBL holder, and effective areas of these driving coils are arranged in certain magnetic fields generated by magnetic circuits. With this structure, the objective lens is driven according to signals provided to the driving coils.

Japanese Patent Application Publication No. 2008-226292 (Patent Document 1), for example, discloses a structure of a conventional objective lens driving device. With reference to FIG. 4 in Patent Document 1 and the description of FIG. 4, various coils are arranged on outer side walls of the lens holder 33. Specifically, tracking coils 41a, 41b, focusing coils 42a, 42b, and radial tilt coils 43a, 43b are attached to the outer side walls of the lens holder 33, and are operated by receiving predetermined control signals to perform focus control, tracking control and tilt control.

As shown in FIGS. 5 and 6, focusing/radial tilt bobbins 91a, 91b and tracking bobbins 92a, 92b are provided on the side walls of the lens holder 33. The aforementioned coils are formed by winding lead wires such as enamel wires around the bobbins.

SUMMARY OF THE INVENTION

In Patent Document 1 described above, the coils are wound around the focusing/radial tilt bobbins 91a, 91b and the tracking bobbins 92a, 92b which are shown in FIG. 5, and each of the bobbins 91a, 91b and 92a, 92b is divided into upper and lower portions arranged separate from each other. Hence, in the case where a bobbin having such a separated shape as shown in FIG. 5 is provided on a lens holder incorporated in a small optical pickup device accommodated, for example, in a notebook PC or the like, the bobbin itself needs to be small in size, and inevitably has a low mechanical strength. For this reason, the bobbin may be deformed or broken in a step of winding a coil in a manufacturing process.

Further, it is a common practice to apply an insulating adhesive to a coil wound around a bobbin to prevent deformation of the coil in use. However, there is another problem that it is difficult to efficiently and evenly apply the insulating adhesive to the coil.

The present invention has been made in view of the aforementioned problems. An object of the present invention is to provide a compact-type objective lens holder and the like including a bobbin making it possible to appropriately wind a coil therearound.

The present invention is an objective lens holder which is movably supported by an objective lens driving device of an optical pickup device and holds an objective lens, the objective lens holder comprising: a main surface portion provided with a fixing part on which the objective lens is fixed; and a side wall portion provided with a bobbin around which a driving coil for driving the objective lens holder itself by using a magnetic effect is wound, wherein the bobbin comprises a tubular portion and a through-hole penetrating the tubular portion in a thickness direction thereof.

Moreover, the present invention is an objective lens driving device in which an objective lens holder holding an objective lens is supported movably relative to an actuator frame, wherein the objective lens holder comprises a main surface portion provided with a fixing part on which the objective lens is fixed and a side wall portion provided with a bobbin around which a driving coil for driving the objective lens holder itself by using a magnetic effect is wound, and the bobbin comprises a tubular portion and a through-hole penetrating the tubular portion in a thickness direction thereof.

Further, an optical pickup device of the present invention is that wherein the objective lens driving device having the above configuration is disposed in a housing.

Furthermore, a method for manufacturing an objective lens driving device of the present invention comprises the steps of: preparing the objective lens holder having the above configuration; accommodating a focusing coil in a region surrounded by the side wall portion; winding a tracking coil around the bobbin; and supplying an adhesive to the tracking coil wound around the bobbin, through the through-hole in the tubular portion of the bobbin.

DESCRIPTION OF THE INVENTIONS

Figure 1:
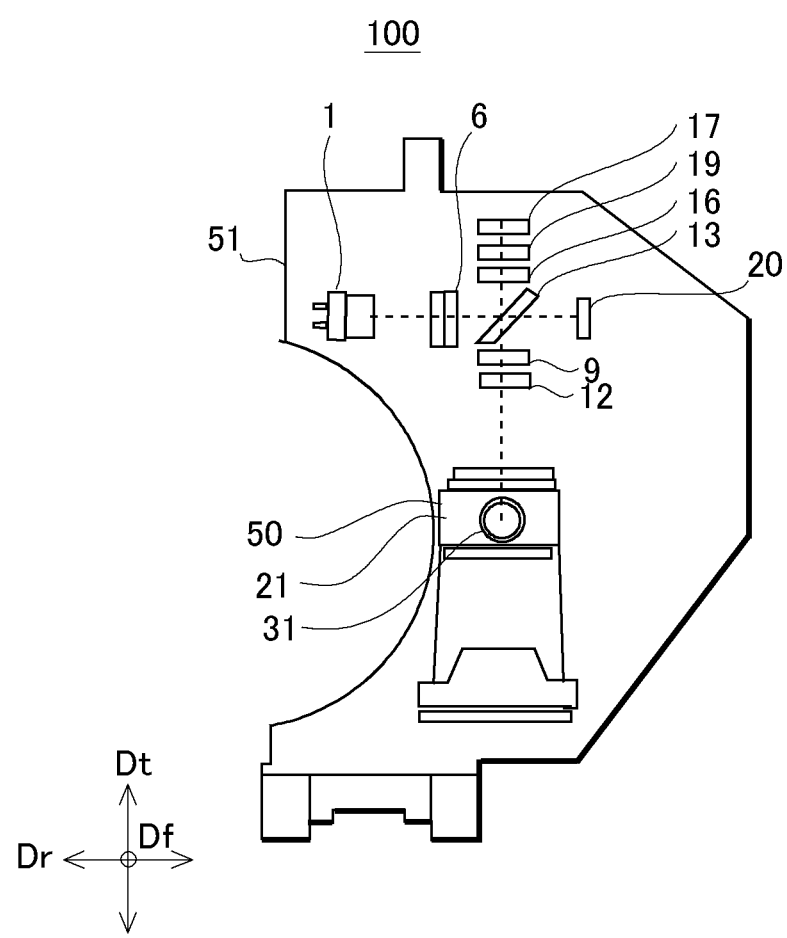
FIG. 1 is a plan view showing an optical pickup device of a preferred embodiment of the invention.

Embodiments of the invention will be described with reference to FIGS. 1 to 5. FIG. 1 is a plan view schematically showing an optical pickup device 100 of an embodiment.

The optical pickup device 100 is configured to support any optical disc compliant with compact disc (CD) standards, digital versatile disc (DVD) standards, and blu-ray disc (BD) standards, for example. The optical pickup device 100 includes an objective lens driving device 50 (an actuator) and various optical components placed in a housing 51. When being schematically described, a function of an optical pickup device is to read and write information from and to an optical disc by emitting a predetermined-standard-compliant laser light beam onto an information recording layer of the optical disc and then by receiving the reflected laser light beam from the information recording layer.

The objective lens driving device 50 movably holds an objective lens holder (hereinafter, an OBL holder) 21. An objective lens 31 compliant with any or all of the aforementioned standards is mounted on the OBL holder 21.

A laser unit 1 includes a laser diode which emits a laser light beam satisfying the aforementioned standards. Specifically, the laser diode emits a laser light beam in a blue-violet (blue) waveband of 395 nm to 420 nm (a wavelength of 405 nm, for example) suitable for a BD, a laser light beam in a red waveband of 645 nm to 675 nm (a wavelength of 650 nm, for example) suitable for a DVD or a laser light beam in a infrared waveband of 765 nm to 805 nm (a wavelength of 780 nm, for example) suitable for a CD.

The laser light beam emitted from the laser unit 1 is separated into a zero-order beam, a first positive order beam, and a first negative order beam by a diffraction grating 6. The light beams are reflected by a semitransparent mirror 13, pass through a quarter wave plate 9 and a collimating lens 12, are reflected by an unillustrated reflecting mirror, and then are focused on an information recording layer of the optical disk by the objective lens 31. Part of the laser light beam emitted from the laser unit 1 passes through the semitransparent mirror 13 and detected by an FMD 20. Based on the detection, output of the laser unit 1 is controlled. The return laser light beam reflected by the information recording layer of the optical disc is transmitted through the reflecting mirror, the collimating lens 12, the quarter wave plate 9, and the semitransparent mirror 13. Thereafter, undesired astigmatism on the return laser light beam is eliminated by a first plate 16 and a second plate 19, desired astigmatism is provided thereto, and then the return laser light beam is detected by an optical detector 17 (PDIC). Based on a signal detected by the optical detector 17, a control signal is supplied to a corresponding one of focusing coils, tracking coils or tilt coils in the OBL holder 21, so that a control current is supplied to the corresponding coil. As a result, focus control, tracking control or radial tilt control is performed. Here, when the focusing coils or the tracking coils also function as the tilt coils, the tilt coils are omitted.

Here, a Dt direction shown in FIG. 1 is a tangential direction, a Dr direction is a tracking direction (a radial direction of the optical disk), and a Df direction is a focusing direction. These directions are orthogonal to each other.

Figure 2A:
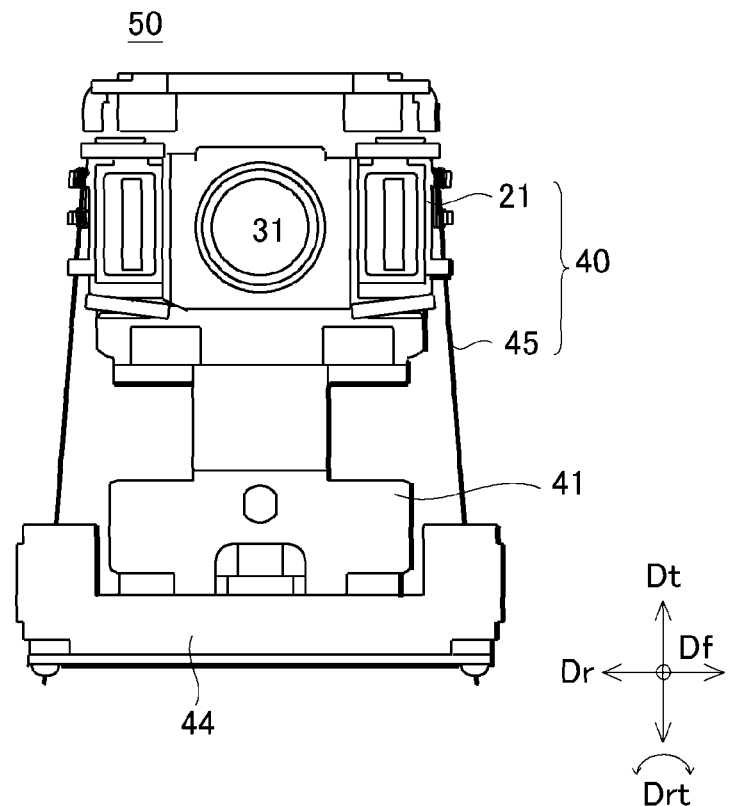
FIG. 2A is a plan view showing an objective lens driving device of the preferred embodiment of the invention as a whole.

The objective lens driving device 50 incorporated in the aforementioned optical pickup device 100 will be described with reference to FIGS. 2A and 2B. FIG. 2A is a plan view showing the objective lens driving device 50, and FIG. 2B is a plan view showing an actuator movable part 40 in an enlarged manner.

With reference to FIG. 2A, the objective lens driving device 50 includes the actuator movable part 40 and an actuator frame 41. The actuator movable part 40 includes the OBL holder 21 and supporting wires 45. The actuator frame 41 is made of a magnetic metal material such as a silicon steel plate. The actuator frame 41 is machined to be partially bent at a right angle, and thereby yokes to be described later are formed.

The actuator movable part 40 is elastically supported by the supporting wires 45 to be movable relative to the actuator frame 41 in the focusing direction (the Df direction), the tracking direction (the Dr direction) and a radially tilting direction (a Drt direction). One end of each supporting wire 45 is fixed on a side wall of the OBL holder 21, and the other end thereof is fixed on a fixed board 44 fixed on the actuator frame 41. The supporting wires 45 are provided in three, for example, on each side surface of the actuator frame 41 to mechanically support the actuator movable part 40 in the air. The supporting wires 45 also function as connection means for allowing currents supplied to the coils provided in the actuator movable part 40.

Figure 2B:
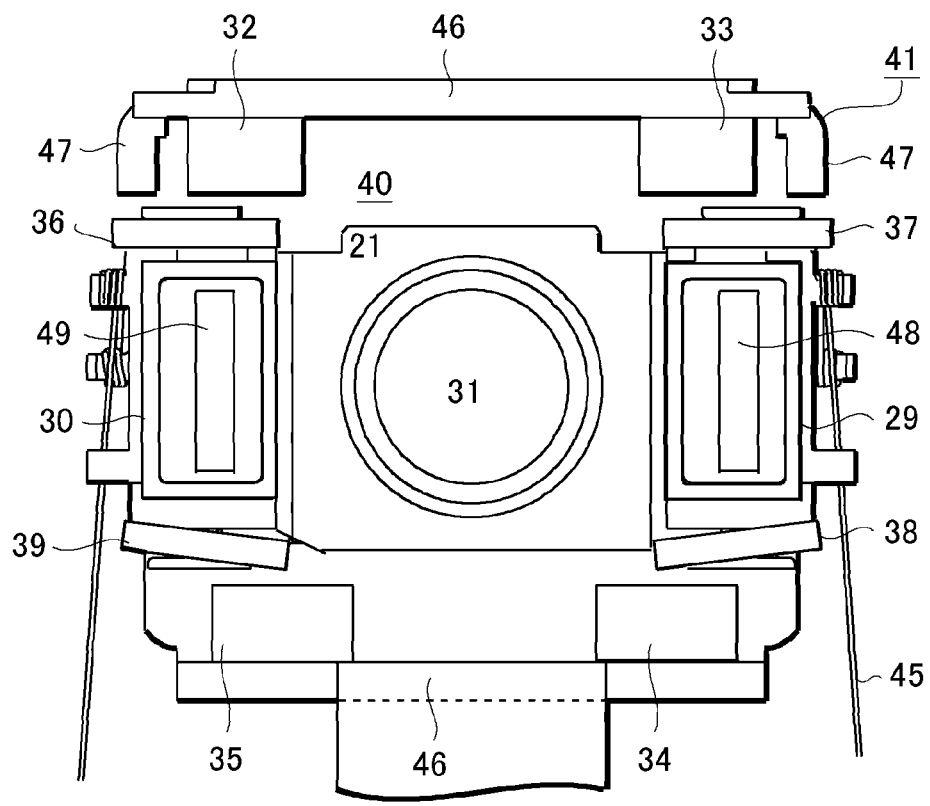
FIG. 2B is a plan view showing an actuator movable part of the objective lens driving device in an enlarged manner.

With reference to FIG. 2B, the actuator movable part 40 mainly includes the OBL holder 21, the objective lens 31 fixed on an upper surface of the OBL holder 21, tracking coils 36, 37, 38, 39 wound around outer surfaces of side-wall portions of the OBL holder 21, and focusing coils 29, 30 incorporated in the OBL holder 21.

Magnets 32, 33, 34, 35 are arranged on yokes of the actuator frame 41 which face the tracking coils 36 to 39 arranged on the outer side of the side-wall portions of the OBL holder 21. Surfaces, of the magnets 32 to 35, facing the tracking coils 36 to 39 have the same polarity (the N polarity, for example). The magnets 32 to 35 generate effective magnetic flux on effective areas of the tracking coils 36 to 39. When currents are supplied to the tracking coils 36 to 39 in such a structure, the OBL holder 21 is moved in the Dt direction due to cooperation of magnetic fields generated by flowing of the currents through the tracking coils 36 to 39 and magnetic circuits generated by magnetic fields generated by the magnets 32 to 35.

The two focusing coils 29, 30 each having a winding axis in the Df direction are arranged at positions across the objective lens 31 inside the OBL holder 21. The magnets 32 to 35 generate the effective magnetic flux also on effective areas of the focusing coils 29, 30. Accordingly, when currents are supplied to the focusing coils 29, 30, the OBL holder 21 is moved in the Df direction due to cooperation of magnetic fields generated by flowing of the currents through the focusing coils 29, 30 and magnetic circuits generated by magnetic fields generated by the magnets 32 to 35. Note that in this embodiment, the OBL holder 21 is controlled to be moved in the tilting direction (the Drt direction) by providing the focusing coils 29, 30 with control signals for the control of movement in the tilting direction.

A back yoke 46 is a portion obtained by machining and bending an end portion of the actuator frame 41 at a right angle, and the magnets 32, 33 are fixedly attached to a side surface of the back yoke 46. Further, sub-yokes 47 are formed by further bending, at a right angle, end portions of the back yoke 46 in the Dr direction. Providing the back yoke 46 and the sub-yokes 47 reduces leakage of the magnetic fields generated by the magnets 32, 33. Even though the magnetic strength of the magnets 32, 33 is small, the OBL holder 21 can be moved in a certain direction.

Opposed yokes 48, 49 are portions formed by bending the actuator frame 41 at a right angle like the back yoke 46 and the like, and are respectively provided at positions inside the focusing coils 29, 30. Arranging the opposed yokes 48, 49 like this makes it possible to enhance the effective magnetic flux effectively acting on the focusing coils 29, 30 and the tracking coils 36 to 39 and is effective to enhance the sensitivity of the OBL holder 21 in the Df, Dr, and Drt directions.

Figure 3A:
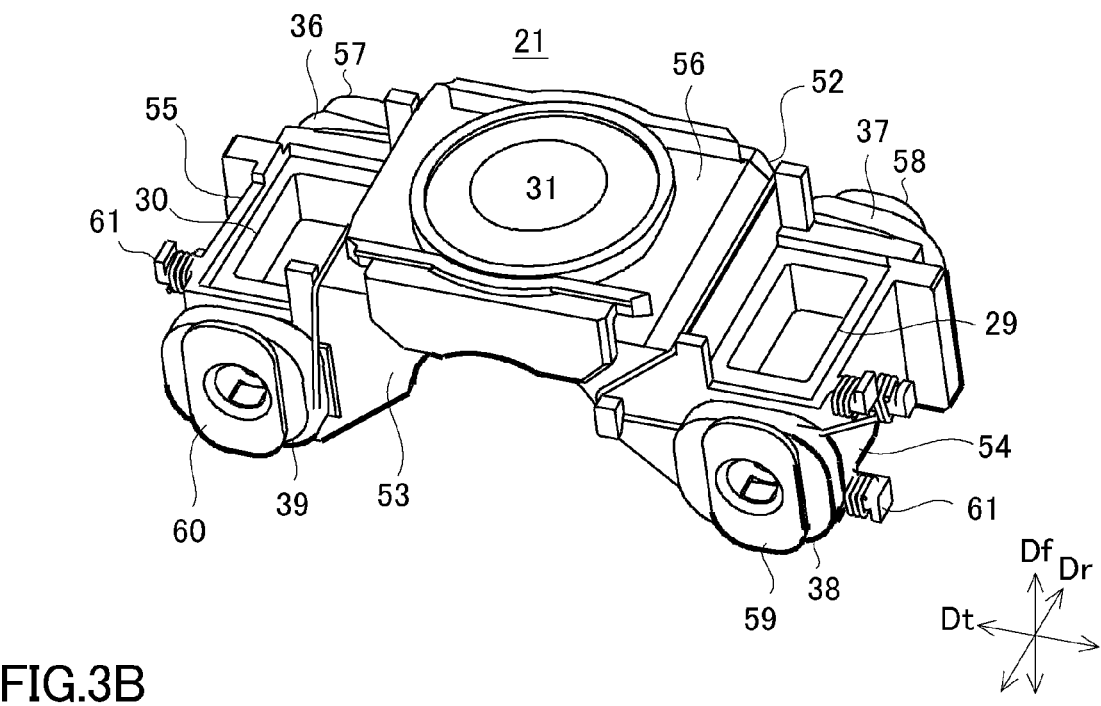
FIG. 3A is a perspective view of an objective lens holder of the preferred embodiment of the invention in a state where various coils and the like are incorporated therein.
Figure 3B:
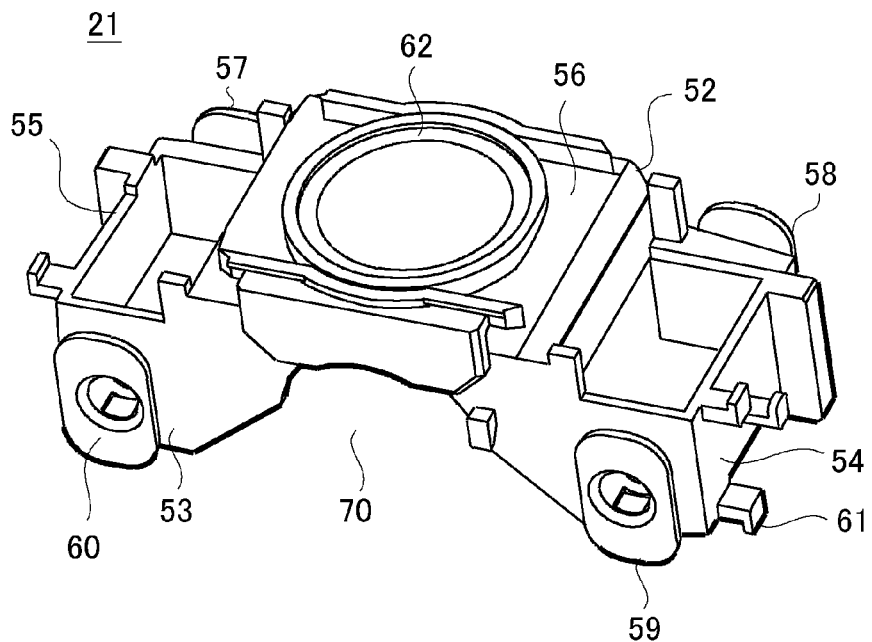
FIG. 3B is a perspective view of the objective lens holder in a state before the coils are incorporated therein.

A structure of the OBL holder 21 included in the aforementioned actuator movable part 40 will be described with reference to FIGS. 3A and 3B. FIG. 3A is a perspective view showing the OBL holder 21 provided with the coils, and FIG. 3B is a perspective view showing only the OBL holder 21.

The schematic shape of the OBL holder 21 has an enclosure shape with an opening portion provided in a lower portion thereof. Specifically, the OBL holder 21 includes: a main surface portion 56 having a circular opening into which the objective lens 31 is mounted; and four side-wall portions continuously and integrally extending from a peripheral portion of the main surface portion 56. The side-wall portions include: a first side-wall portion 52 extending in a longitudinal direction of the OBL holder 21 on the backside of the drawing; a second side-wall portion 53 opposed to the first side-wall portion 52 on the front side of the drawing; a third side-wall portion 54 provided in the OBL holder 21 on the right side of the drawing; and a fourth side-wall portion 55 provided on an end portion of the OBL holder 21 on the left side of the drawing. Main surfaces of the first side-wall portion 52 and the second side-wall portion 53 are parallel to the Dt direction, and main surfaces of the third side-wall portion 54 and the fourth side-wall portion 55 are parallel to the Dr direction.

Bobbins 57, 58 are provided on the main surface of the first side-wall portion 52 on the outside thereof, and the tracking coils 36, 37 are wound around the bobbins 57, 58, respectively. Bobbins 59, 60 are provided on the main surface of the second side-wall portion 53 on the outside thereof, and the tracking coils 38, 39 are wound around the bobbins 59, 60, respectively. In this embodiment, the bobbins 57 to 60 are arranged in end portions located at outer positions in the Dt direction than the objective lens 31. This is because, when the OBL holder 21 is accommodated in a small optical pickup, the reflecting mirror is arranged immediately below the objective lens 31, and a space 70 for securing an optical path to the reflecting mirror needs to be provided in a region ranging from the center to below the first side-wall portion 52 or the second side-wall portion 53 of the OBL holder 21. Thus, the region has no margin for accommodating the components such as the coils.

The tracking coils 36 to 39 wound around the respective bobbins 57 to 60 are formed by a single thin and long lead wire such as an enameled wire. One end of the wire is wound around one of winding portions 61 formed by protruding a portion of the third side-wall portion 54, and the other end is wound around one of winding portions 61 provided on the fourth side-wall portion 55. Here, each of the tracking coils 36 to 39 has a winding axis in the Dr direction and is wound around a corresponding one of the bobbins 57 to 60 to shape a rectangle as a whole with its corners rounded. The tracking coils 36 to 39 are driving coils for driving the OBL holder 21 itself by using a magnetic effect. The focusing coils 29, 30 to be described later also have such a function.

The winding portions 61 are provided in three on the third side-wall portion 54. Ends of an enameled wire forming the focusing coil 29 are wound around the respective two of the winding portions 61, while the one end of each of the tracking coils 36 to 39 is wound around on the rest one of the winding portions 61. Likewise, the winding portions 61 are provided in three on the fourth side-wall portion 55. Ends of an enameled wire forming the focusing coil 30 are wound around the respective two of the winding portions 61, while the other end of each of the tracking coils 36 to 39 is wound around on the rest one of the winding portions 61. The enameled wires wound around the winding portions 61 are connected to the supporting wires 45 shown in FIG. 2A.

The focusing coils 29, 30 are accommodated inside the OBL holder 21. The focusing coil 29 is arranged in an end portion on the third side-wall portion 54 side, while the focusing coil 30 is arranged in an end portion on the fourth side-wall portion 55 side. Accordingly, the focusing coils 29, 30 are arranged at outer positions in the Dt direction than the objective lens 31. Each of the focusing coils 29, 30 has the winding axis in the Df direction, and is formed by winding the enameled wire to shape a rectangle as a whole with its corners rounded. Here, while the aforementioned tracking coils 36 to 39 are directly wound around the bobbins 57 to 60 which are part of the OBL holder 21, the focusing coils 29, 30 are prepared in an already wound state and fixedly attached to the inside of the OBL holder 21 by using an adhesive. In addition, although being not shown, protruding portions for accommodating the focusing coils 29, 30 at predetermined positions are provided in the OBL holder 21.

Note that the aforementioned OBL holder 21 has an enclosure shape having the four side-wall portions, but may have another shape. For example, the OBL holder 21 may have a structure in which only the first side-wall portion 52 and the second side-wall portion 53 are provided upright on the main surface portion 56.

Figure 4A:
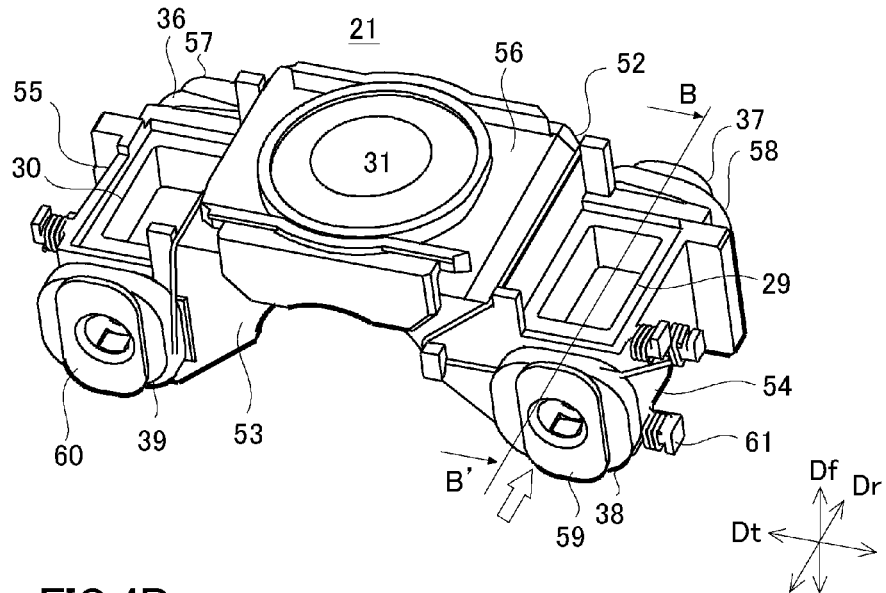
FIG. 4A is a perspective view of the objective lens holder of the preferred embodiment of the invention in the state where the various coils are incorporated therein.

A structure of the bobbins 57 to 60 provided on the aforementioned OBL holder 21 will be described with reference to FIGS. 4A to 4D. FIG. 4A is a perspective view showing the OBL holder 21, FIG. 4B is a cross-sectional view of the OBL holder 21 taken along the B-B' line of FIG. 4A, FIG. 4C is a cross-sectional view showing the bobbin 59 in the enlarged manner, and FIG. 4D is a view of the bobbin 59 seen from a direction indicated by an outlined arrow in FIG. 4A.

Figure 4B:
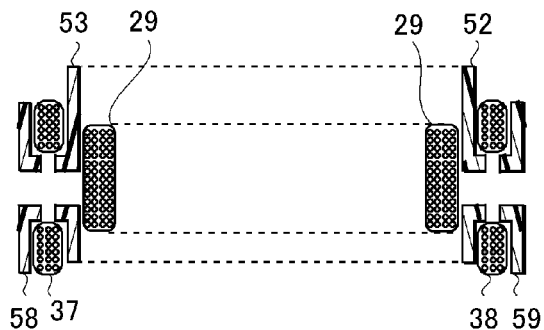
FIG. 4B is a cross-sectional view of the objective lens holder in FIG. 4A.
Figure 4C:
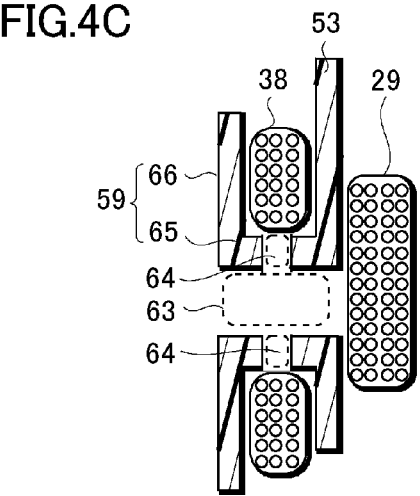
FIG. 4C is a cross-sectional view showing a portion of the objective lens holder in an enlarged manner.
Figure 4D:
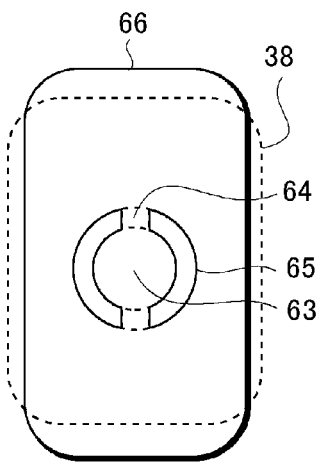
FIG. 4D is a side view of a flange portion.

With reference to FIG. 4B, the tracking coil 37 is wound around the flange-shaped bobbin 58 protruding outward from the first side-wall portion 52 of the OBL holder 21. Likewise, the tracking coil 38 is wound around the flange-shaped bobbin 59 protruding outward from the second side-wall portion 53. In addition, the focusing coil 29 is arranged to face inner main surfaces of the first side-wall portion 52 and the second side-wall portion 53 at positions where the bobbins 58, 59 are provided. The bobbins 57, 60, the tracking coils 36, 39, and the focusing coil 30 provided on the other side of the OBL holder 21 have the same structure.

The aforementioned tracking coils 36 to 39 and the focusing coils 29, 30 have the adhesive such as an epoxy resin impregnated thereinto. In this way, even though magnetic force acts on the coils while the optical pickup device 100 is being used, such impregnation prevents the magnetic force from deforming the enameled wires forming the coils. Further, fixing the tracking coils 36 to 39 and the focusing coils 29, 30 onto the OBL holder 21 by using the adhesive prevents the coils from moving and being separated while the optical pickup device 100 is being used.

A structure of the bobbin 59 will be described with reference to FIG. 4C. The bobbin 59 includes: a tubular portion 65 shaped into a cylinder protruding outward from the second side-wall portion 53; and a flange portion 66 formed by extending an outer end portion of the tubular portion 65 in a radial direction. The tubular portion 65 and the flange portion 66 forming the bobbin 59 have the same thickness as that of the other portions of the OBL holder 21. The tubular portion 65 has a cylindrical shape having a circular cross-section, but may have another shape having a cross-section of, for example, an ellipse which is long in a vertical direction on the drawing, a square with its corners rounded or the like.

With reference to FIG. 4D, the flange portion 66 is herein shaped into a rectangle with its corners rounded which is long in the vertical direction on the drawing, but may be shaped into an ellipse having a longitudinal axis in the vertical direction or a circle. The length in the vertical direction of the flange portion 66 is set longer than the outside dimension of the tracking coil 38. This makes it possible to reliably wind the tracking coil 38 inside the flange portion 66. Incidentally, the width in a horizontal direction of the flange portion 66 may be shorter than the outside dimension of the tracking coil 38.

The tubular portion 65 around which the tracking coil 38 is wound is basically formed to be continuous in a circumferential direction. This ensures that the tubular portion 65 has a certain strength or higher. Thus, even if the tracking coil 38 is wound at high tension force around the tubular portion 65 made of a thin resin material, deformation or breakage of the tubular portion 65 involved with the winding is prevented.

Meanwhile, the bobbin 59 is provided with the flange portion 66 extended in the radial direction from perimeter end portion of the tubular portion 65. With this structure, the flange portion 66 reinforces the end portion of the tubular portion 65, increasing an effect of preventing the deformation of the tubular portion 65 in winding the tracking coil 38. Further, also while the optical pickup device 100 is being used, the flange portion 66 holds the entire tracking coil 38, and thus the tracking coil 38 is prevented from coming off the bobbin 59.

Note that the other bobbins 57, 58, 60 have the same structure as that of the aforementioned bobbin 59.

Through-holes 64 are provided in the tubular portion 65 in the OBL holder 21 of this embodiment, respectively penetrating portions of the tubular portion 65 in a thickness direction thereof. Specifically, with reference to FIG. 4C, the through-holes 64 are provided at two positions in an upper end portion (on a first direction side) and a lower end portion (on a second direction side) of the tubular portion 65, respectively. The provision of the through-holes 64 makes it possible to supply the adhesive to the tracking coil 38 through the through-holes 64 in the course of a manufacturing process of the objective lens driving device 50. Since the through-holes 64 are formed as small as possible while allowing the adhesive supplied to the tracking coil 38 to pass through the through-holes 64, the mechanical strength deterioration of the tubular portion 65 due to the provision of the through-holes 64 is reduced. In addition, the number of the through-holes 64 is two, and the small number contributes to the securing of the strength.

Further, in this embodiment, the inside of the bobbin 59 serves as a communication hole 63 penetrating the second side-wall portion 53 and communicating with the inside of the OBL holder 21. With this structure, the adhesive in a liquid state to be impregnated into the focusing coil 29 can be supplied to the focusing coil 29 through the communication hole 63. Since the focusing coil 29 is in close contact with the inner side surface of the second side-wall portion 53, the adhesive can be easily supplied to the focusing coil 29 through the communication hole 63. Further, with reference to FIG. 4A, the bobbins 58, 59 each having the communication hole 63 is arranged on each side of the focusing coil 29 in the Dr direction, and thus the adhesive can be supplied to the focusing coil 29 through the two communication holes 63.

Other embodiments of the aforementioned bobbin 59 will be described with reference to FIGS. 5A, 5B, and 5C, which are cross-sectional views of bobbins 59 of other embodiments.

Figure 5A:
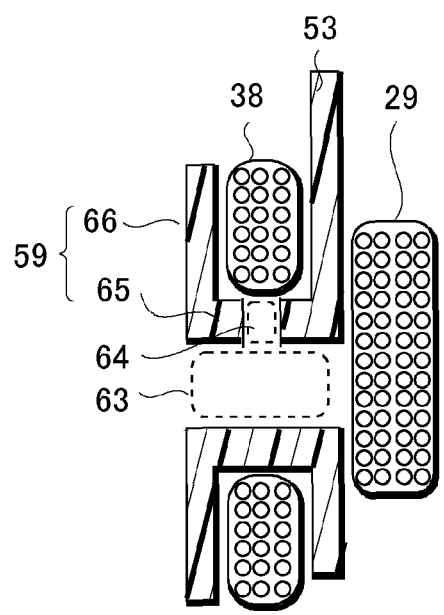
FIGS. 5A, 5B, and 5C are each a cross-sectional view of a bobbin of another embodiment of the objective lens holder of the preferred embodiment of the invention.

With reference to FIG. 5A, only one through-hole 64 is provided in an end portion on the upper side (a side close to the objective lens 31) of a tubular portion 65. This makes it possible to supply an adhesive to a tracking coil 38 through the through-hole 64, and provision of the tubular portion 65 exhibits an effect of reducing the strength deterioration.

Figure 5B:
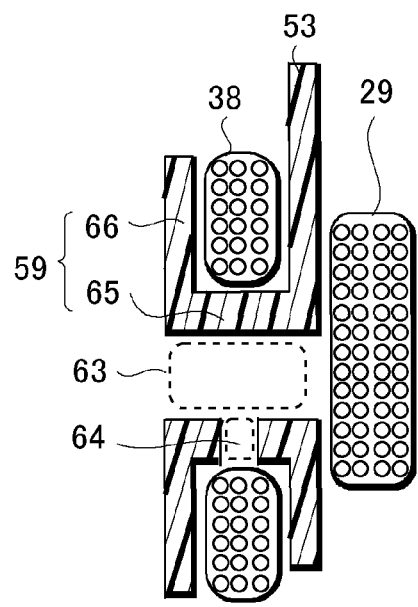

In FIG. 5B, one through-hole 64 is provided in an end portion on the lower side (a side farther from the objective lens 31) of a tubular portion 65.

Figure 5C:
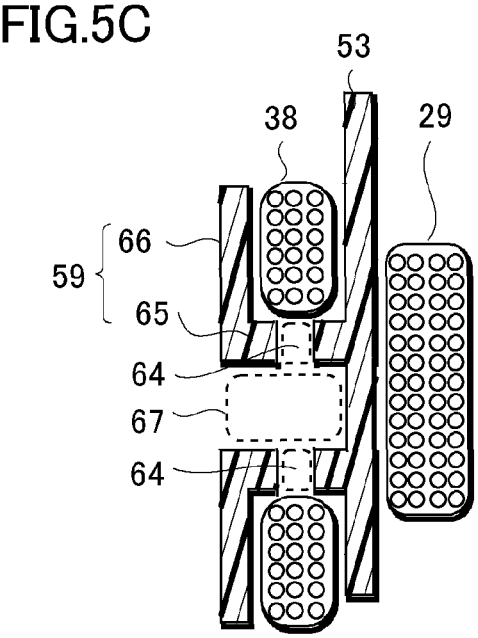

With reference to FIG. 5C, the inside of a tubular portion 65 of a bobbin 59 forms a hole portion 67 which is a closed bottom hole, instead of a communication portion penetrating a second side-wall portion 53. That is, in this embodiment, the inside of the tubular portion 65 does not necessarily communicate with the inside of the OBL holder 21 shown in FIG. 4A. In this case, an adhesive is supplied to a tracking coil 38 through the hole portion 67 and through-holes 64 of the bobbin 59. As for a focusing coil 29, the adhesive is supplied thereto from other portions, for example, from the opening in the lower portion of the OBL holder 21 shown in FIG. 4A.

Figure 6A:
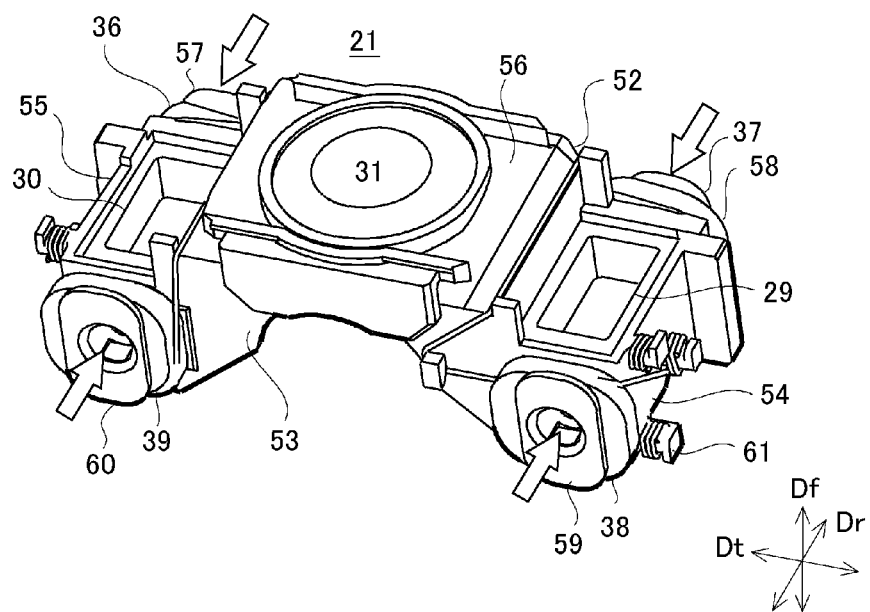
FIG. 6A is a perspective view showing a step of supplying an adhesive through bobbins in a method for manufacturing the objective lens driving device of the preferred embodiment of the invention.
Figure 6B:
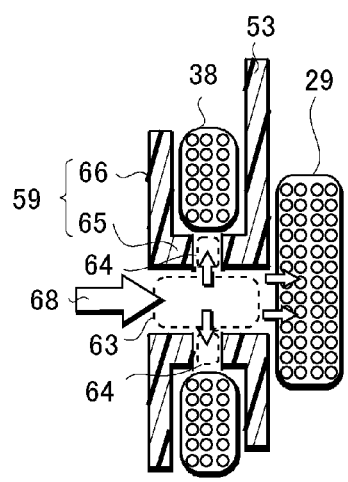
FIG. 6B is a cross-sectional view showing in detail a state of one of the bobbins in the step of supplying an adhesive.

Next, a method for manufacturing an objective lens driving device in the aforementioned structure will be described with reference to the drawings described above and FIGS. 6A and 6B. FIG. 6A is a perspective view showing an OBL holder 21, and FIG. 6B is a cross-sectional view of the OBL holder 21 showing a step of supplying an adhesive 68 through a bobbin 59 in the method for manufacturing an objective lens driving device.

Firstly, an OBL holder 21 having the shape as shown in FIG. 3B is prepared. The OBL holder 21 is formed by injecting a resin material such as a liquid crystal polymer into a cavity of a mold. The OBL holder 21 has four side-wall portions, and bobbins around which tracking coils are wound are provided integrally with a first side-wall portion 52 and a second side-wall portion 53 of the four side-wall portions.

Next, with reference to FIG. 3A, tracking coils 36, 37, 38, 39 corresponding to bobbins 57, 58, 59, 60, respectively, are formed by winding a single enameled wire around the bobbins 59, 58, 57, 60 in this order by an automated machine. One end of the enameled wire forming the tracking coils 36 to 39 is wound around a winding portion 61 provided on a third side-wall portion 54, and the other end thereof is wound around a winding portion 61 provided on a fourth side-wall portion 55.

Further, focusing coils 29, 30 are accommodated in the OBL holder 21. Specifically, the focusing coils 29, 30 are accommodated in the OBL holder 21 from an opened lower portion of the OBL holder 21. Then, ends of an enameled wire forming the focusing coil 29 are wound around respective winding portions 61 provided on the third side-wall portion 54. Ends of an enameled wire forming the focusing coil 30 are also wound around respective winding portions 61 provided on the fourth side-wall portion 55.

In addition, an objective lens 31 is fixed on a fixing part 62 provided on a main surface portion 56 of the OBL holder 21 by using an insulating adhesive.

Next, the adhesive such as an epoxy resin is supplied to the coils. Specifically, the adhesive in a liquid state is supplied to the coils through communication holes of the bobbins 57 to 60 in this embodiment. In FIG. 6A, outlined arrows indicate positions at which the adhesive is supplied.

A method for supplying an adhesive through a bobbin 59 will be described in detail with reference to FIG. 6B. As described above, the bobbin 59 includes a tubular portion 65 and a flange portion 66, and through-holes 64 penetrating the tubular portion 65 in a thickness direction thereof are provided in upper and lower end portions of the tubular portion 65. For this reason, when being supplied to a communication hole 63 of the bobbin 59, an adhesive 68 in a liquid state enters a space surrounded by the flange portion 66 and a second side-wall portion 53 through the through-holes 64. Then, the thus entering adhesive 68 is impregnated into gaps created by an enameled wire wound many times to form a tracking coil 38. In addition, some of the adhesive 68 enters between the tracking coil 38, the flange portion 66, and the second side-wall portion 53. Thereafter, the adhesive 68 is hardened. The adhesive 68 is of a type to harden due to application of energy generated by beam irradiation, heating or the like, energy is applied to the adhesive 68. Thereby, the tracking coil 38 is fixed onto the OBL holder 21 due to the adhesive 68, while the tracking coil 38 is solidified.

Here, since the two through-holes 64 are provided in the upper and lower end portions of the tubular portion 65, respectively, the adhesive 68 can be supplied approximately evenly over the entire tracking coil 38. Note that the number of the through-holes 64 is not limited to two, but may be one or three or more.

The method for supplying the adhesive 68 to the tracking coil 38 is also applied to other bobbins 57, 58, 60.

Further, in this embodiment, the adhesive 68 is supplied also to a focusing coil 29 through the communication hole 63. Specifically, the communication hole 63 of the bobbin 59 communicates with the OBL holder 21, and the communication hole 63 faces a side surface of the focusing coil 29. Accordingly, when being supplied to the communication hole 63, the adhesive 68 in the liquid state is supplied to the tracking coil 38 through the through-holes 64 as described above, and also enters the OBL holder 21 through the communication hole 63 to reach the focusing coil 29. Thereby, the adhesive 68 is impregnated into gaps of a wound enameled wire forming the focusing coil 29. Further, the adhesive 68 enters between the focusing coil 29 and the second side-wall portion 53. Thereafter, as in the case of the tracking coil 38, the adhesive 68 is hardened, thereby the enameled wire forming the focusing coil 29 is solidified, and the focusing coil 29 is fixed on the second side-wall portion 53. Such a method is also applied to the other bobbins 57, 58, 60.

As shown in FIG. 6A, the bobbins 58, 59 are arranged at symmetrical positions in such a manner as to sandwich the focusing coil 29. Thus, when being supplied from the communication holes 63 provided in the respective bobbins 58, 59, the adhesive 68 can be distributed over the entire focusing coil 29.

As clear from the aforementioned description, supplying the adhesive 68 to the bobbin 59 makes it possible to supply the adhesive 68 to both the tracking coil 38 and the focusing coil 29. Thereby, the step of supplying the adhesive 68 is simplified to reduce manufacturing cost.

After the end of the step described above, the coils are connected and fixed to supporting wires 45 on winding portions provided on side surfaces of an OBL holder 21, as shown in FIGS. 2A and 2B. Thereby, an actuator movable part 40 including the OBL holder 21 is supported by an actuator frame 41 using the supporting wires 45, so that an objective lens driving device 50 is formed.

Further, with reference to FIG. 1, the objective lens driving device 50 having such a structure is accommodated in a housing 51 together with other optical devices and electronic components, so that an optical pickup device 100 is formed.

According to the objective lens holder of the preferred embodiments of the invention, the bobbins for winding the coils are provided on the side-wall portions of the objective lens holder. In addition, the communication holes are provided in the tubular portions forming the bobbins, penetrating the tubular portions in the thickness direction. Hence, the bobbins have higher mechanical strength than that of the bobbins in the related art in which each bobbin is separated into the upper and lower portions, and thus the breakage and deformation of the bobbins involved with the winding of the coils are prevented.

Further, according to the preferred embodiments of the invention, after each coil is wound around the bobbin, the adhesive can be supplied to the coil from the inside of the corresponding tubular portion of the bobbin through the through-hole provided in the tubular portion. Hence, the adhesive in the liquid state can be supplied to the coil without leaking to the outside.

What is claimed is:

1. An objective lens holder which is movably supported by an objective lens driving device of an optical pickup device and holds an objective lens, the objective lens holder comprising:
    a main surface portion provided with a fixing part on which the objective lens is fixed;
    a side wall portion provided with a bobbin around which a tracking coil for driving the objective lens holder by using a magnetic effect is wound, the bobbin comprising a tubular portion and a through-hole penetrating the tubular portion in a thickness direction thereof, and the bobbin comprising a communication hole allowing a region inside the side wall portion to communicate with outside;
    an adhesive disposed in the through-hole so as to reach the tracking coli; and
    a focusing coil accommodated in the region inside the side wall portion,
    wherein the through-hole and the communication hole are connected, and the adhesive extends through the through-hole and the communication hole so as to reach the tracking coil and focusing coil.

2. The objective lens holder according to claim 1, wherein the through-hole is arranged on a first direction side or a second direction side of the tubular portion, the first direction side being closer to the objective lens than the second direction side is, the second direction side being opposed to the first direction side.

3. The objective lens holder according to claim 2, wherein the through-hole is provided on each of the first direction side and the second direction side of the tubular portion.

4. The objective lens holder according to claim 1, wherein the bobbin further includes a flange portion formed by extending a perimeter around an outer end portion of the tubular portion.

5. The objective lens holder according to claim 4, wherein an end portion of the flange portion in a focusing direction of the objective lens protrudes outward from an outer peripheral end portion of the coil wound around the bobbin.

6. The objective lens holder according to claim 1, wherein laser light emitted onto the objective lens passes through a space provided by cutting out a part of the side wall portion provided with the bobbin.

7. A method for manufacturing an objective lens driving device comprising the steps of:
    providing an object lens holder comprising a main surface portion provided with a fixing part on which an objective lens is fixed and comprising a side wall portion provided with a bobbin, the bobbin comprising a tubular portion and a through-hole penetrating the tubular portion in a thickness direction thereof;

accommodating a focusing coil in a region surrounded by the side wall portion, and the bobbin comprising a communication hole allowing the region surrounded by the side wall to communicate with outside;

winding a tracking coil around the bobbin; and supplying an adhesive to both the tracking coil wound around the bobbin and the focusing coil at the same time through the through-hole in the tubular portion of the bobbin and the communication hole of the bobbin, respectively.

* * * * *